US 12,261,561 B2

United States Patent
Khan et al.

(10) Patent No.: US 12,261,561 B2
(45) Date of Patent: Mar. 25, 2025

(54) ELECTRIFIED VEHICLE WITH INVERTER CONTROLLED TO HEAT TRACTION BATTERY

(71) Applicant: Ford Global Technologies, LLC, Dearborn, MI (US)

(72) Inventors: Mohammad Sameer Khan, Windsor (CA); Jonathan Hair, Northville, MI (US); Matthew Penne, Pierce, NE (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 18/306,614

(22) Filed: Apr. 25, 2023

(65) Prior Publication Data

US 2024/0364253 A1    Oct. 31, 2024

(51) Int. Cl.
| | |
|---|---|
| *H02P 29/68* | (2016.01) |
| *B60H 1/22* | (2006.01) |
| *B60L 15/20* | (2006.01) |
| *B60L 50/60* | (2019.01) |
| *B60L 58/27* | (2019.01) |
| *H02P 27/06* | (2006.01) |

(52) U.S. Cl.
CPC ............. *H02P 29/68* (2016.02); *B60H 1/22* (2013.01); *B60L 15/20* (2013.01); *B60L 50/60* (2019.02); *B60L 58/27* (2019.02); *H02P 27/06* (2013.01); *B60L 2240/525* (2013.01); *B60L 2240/545* (2013.01)

(58) Field of Classification Search
CPC ........ H02P 27/06; H02P 27/08; H02P 27/085; H02P 29/60; H02P 29/62; H02P 29/64; H02P 29/68; H02P 25/022; B60L 1/22; B60L 2240/525; B60L 2240/545; B60L 15/20; B60L 1/02; B60L 2240/526; B60L 50/60; B60L 58/27; B60L 58/25; B60H 1/22

See application file for complete search history.

(56) References Cited

U.S. PATENT DOCUMENTS

| | | | |
|---|---|---|---|
| 10,432,186 B2 | 10/2019 | Yang et al. | |
| 10,491,095 B2 | 11/2019 | Chen et al. | |
| 10,974,570 B2 | 4/2021 | Chevers et al. | |
| 2019/0070924 A1 | 3/2019 | Mancini et al. | |
| 2023/0249520 A1* | 8/2023 | Turudic | ............. B60H 1/00385 165/201 |

* cited by examiner

*Primary Examiner* — Antony M Paul
(74) *Attorney, Agent, or Firm* — Brooks Kushman P.C.

(57) ABSTRACT

A system for an electrified vehicle, such as a battery electric vehicle (BEV), includes an inverter and a controller. The inverter is configured to drive a traction motor with electrical power from a traction battery, such as a lithium ion phosphate (LFP) traction battery, according to a configuration of a power switch (e.g., IBGT or MOSFET) of the inverter. The system further includes a controller configured to control a variable gate driver resistance for the power switch in a closed loop fashion to achieve a target temperature of the inverter. The system may further include a heating coolant loop for transferring heat generated by the inverter to the traction battery to warm the traction battery. The controller may be further configured to further control a switching frequency of the power switch in the closed loop fashion to achieve the target temperature of the inverter.

20 Claims, 7 Drawing Sheets

ELECTRIFIED VEHICLE WITH INVERTER CONTROLLED TO HEAT TRACTION BATTERY

TECHNICAL FIELD

The present disclosure relates to controlling an inverter of an electrified vehicle to heat a traction battery of the electrified vehicle.

BACKGROUND

An electrified vehicle includes a traction powertrain having a traction battery, an inverter, and a traction motor. The traction motor is powered with electrical energy from the traction battery via the inverter to propel the electrified vehicle.

SUMMARY

A system having an inverter and a controller is provided. The inverter is configured to drive a traction motor with electrical power from a traction battery according to a configuration of a power switch of the inverter. The controller is configured to control a variable gate driver resistance for the power switch in a closed loop fashion to achieve a target temperature of the inverter.

The controller may increase the gate driver resistance to increase an actual temperature of the inverter. The controller may decrease the gate driver resistance to decrease the actual temperature of the inverter.

The system may further include a heating coolant loop for transferring heat generated by the inverter to the traction battery to warm the traction battery.

The target temperature of the inverter may depend on a target temperature of the traction battery.

The controller may be further configured to further control a switching frequency of the power switch in the closed loop fashion to achieve the target temperature of the inverter. In this case, the controller may increase the switching frequency to increase an actual temperature of the inverter. The controller may decrease the switching frequency to decrease the actual temperature of the inverter.

The power switch may either be an insulated-gate bipolar transistor (IGBT) power switch or a metal-oxide-semiconductor field-effect transistor (MOSFET) transistor.

The inverter may include a plurality of power switches and be configured to drive the traction motor with electrical power from the traction battery according to a configuration of the power switches. In this case, the controller is further configured to control a variable gate driver resistance for each of the power switches in the closed loop fashion to achieve the target temperature of the inverter.

A method for use with a power electronics module (PEM), such as an inverter, configured to drive a traction motor with electrical power from a traction battery, such as a lithium ion phosphate (LFP) traction battery, according to a configuration of a power switch of the PEM is provided. The method includes setting a gate driver resistance for the power switch according to a difference between an actual temperature of the traction battery and a desired temperature of the traction battery. The method further includes controlling the power switch with the gate driver resistance to thereby cause the PEM to generate an amount of heat dependent on the gate driver resistance. The method further includes transferring at least some of the heat generated by the PEM to the traction battery to warm the traction battery.

The method may further include setting a switching frequency for the power switch according to the difference between the actual temperature of the traction battery and the desired temperature of the traction battery, controlling the power switch further with the switching frequency to thereby cause the PEM to generate an additional amount of heat dependent on the switching frequency, and transferring at least some of the additional heat generated by the PEM to the traction battery to warm the traction battery.

An electrified vehicle including a traction battery (e.g., a LFP traction battery), a traction motor, a PEM (e.g., an inverter), a controller, and a heating coolant loop is provided. The PEM is configured to drive the traction motor with electrical power from the traction battery according to a configuration of a power switch of the PEM. The controller is configured to set a gate driver resistance for the power switch according to a difference between an actual temperature of the traction battery and a desired temperature of the traction battery and to control the power switch with the gate driver resistance to thereby cause the PEM to generate an amount of heat dependent on the gate driver resistance. The heating coolant loop is configured to transfer at least some of the heat generated by the PEM to the traction battery to warm the traction battery.

The controller may be further configured to set a switching frequency for the power switch according to the difference between the actual temperature of the traction battery and the desired temperature of the traction battery and to control the power switch further with the switching frequency to thereby cause the PEM to generate an additional amount of heat dependent on the switching frequency. The heating coolant loop is further configured to transfer at least some of the additional heat generated by the PEM to the traction battery to warm the traction battery.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
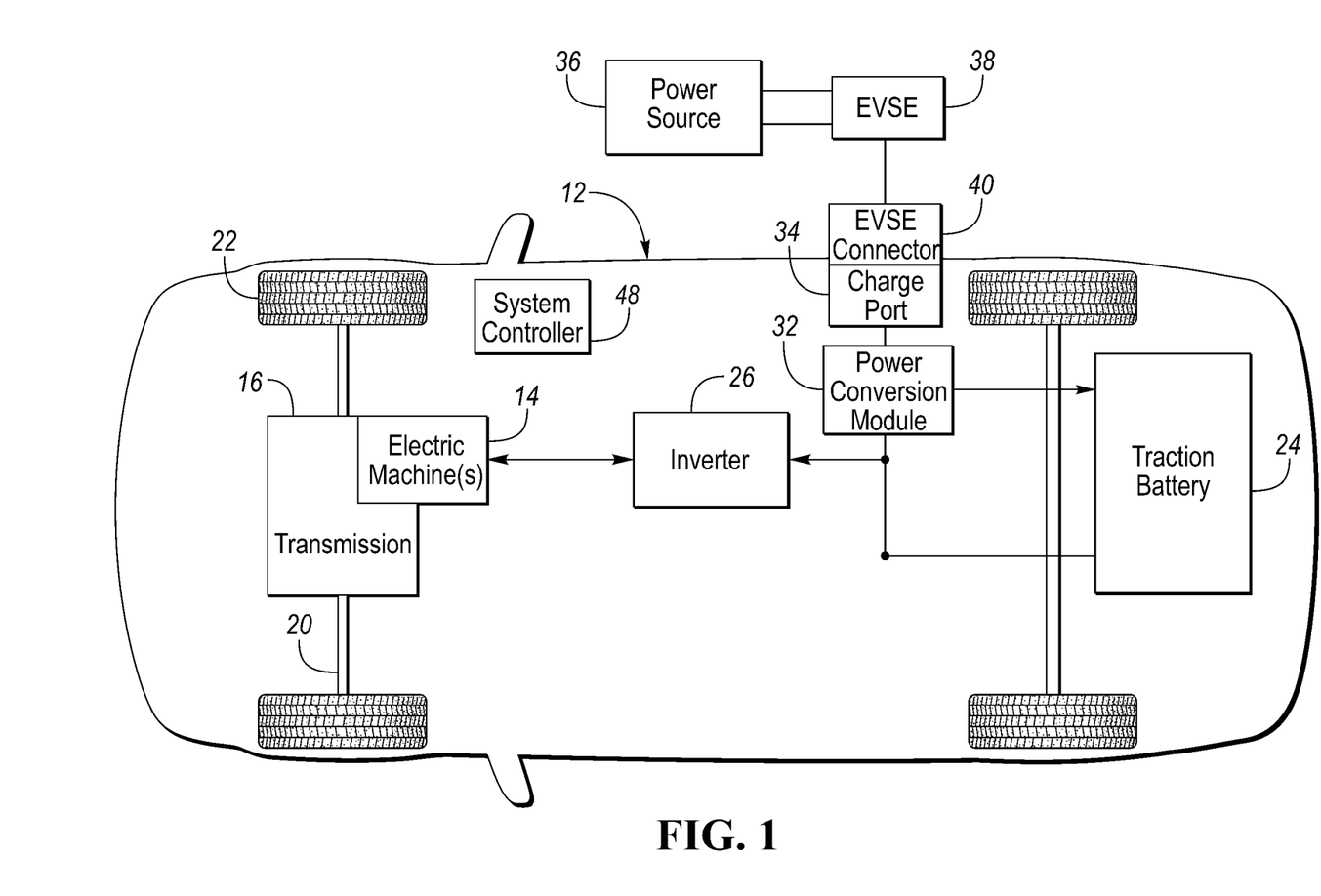
FIG. 1 illustrates a block diagram of a battery electric vehicle (BEV) having a traction powertrain including a traction battery, an inverter, and a traction motor.

Referring now to FIG. 1, a block diagram of an electrified vehicle 12 in the form of a battery electric vehicle (BEV) is shown. BEV 12 has a traction powertrain including one or more traction motors ("electric machine(s)") 14, a traction battery ("battery" or "battery pack") 24, and a power electronics module in the form of an inverter 26 (or inverter system controller (ISC)). In the BEV configuration, traction battery 24 provides all of the propulsion power and the electrified vehicle does not have an engine. In other variations, the electrified vehicle may be a plug-in (or non-plug-in) hybrid electric vehicle (HEV) further having an engine.

Traction motor 14 is part of the traction powertrain of BEV 12 for powering movement of the BEV. In this regard, traction motor 14 is mechanically connected to a transmission 16 of BEV 12. Transmission 16 is mechanically connected to a drive shaft 20 that is mechanically connected to wheels 22 of BEV 12. Traction motor 14 can provide propulsion capability to BEV 12 and is capable of operating as a generator. Traction motor 14 acting as a generator can recover energy that may normally be lost as heat in a friction braking system of BEV 12.

Traction battery 24 stores electrical energy that can be used by traction motor 14 for propelling BEV 12. Traction battery 24 typically provides a high-voltage (HV) direct current (DC) output. Traction battery 24 is electrically connected to inverter 26. Traction motor 14 is also electrically connected to inverter 26. Inverter 26 provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of BEV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. Controller 48 may be a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Traction battery 24 may have one or more temperature sensors such as thermistors in communication with controller 48 to provide data indicative of the temperature of the traction battery for the controller to monitor the temperature of the traction battery. BEV 12 may further include a temperature sensor to provide data indicative of ambient temperature for controller 48 to monitor the ambient temperature.

Figure 2:
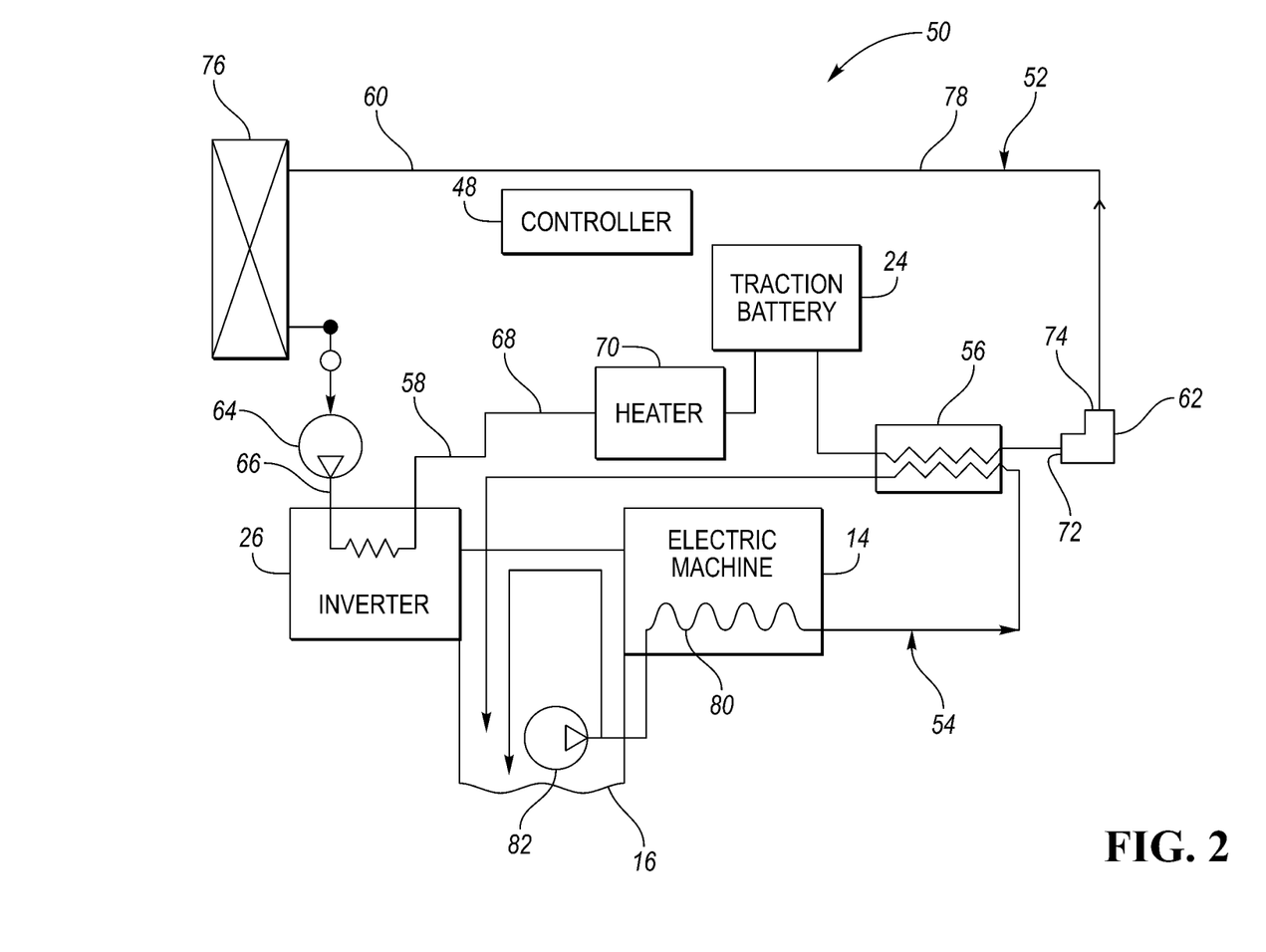
FIG. 2 illustrates a block diagram of a thermal management arrangement of the BEV to transfer heat from the inverter to the traction battery.

Referring now to FIG. 2, with continual reference to FIG. 1, a block diagram of a thermal management arrangement 50 of BEV 12 to transfer heat from inverter 26 to traction battery 24 is shown. Thermal management arrangement 50 includes a first heating loop 52 using a first heating fluid and a second heating loop 54 using a second heating fluid. First heating loop 52 and second heating loop 54 are in thermal communication via a heat exchanger 56. The first heating fluid may be a water-based coolant and may include ethylene glycol or similar additives, the second heating fluid may be an oil-based fluid, and heat exchanger 56 may be an oil-to-coolant heat exchanger.

First heating loop 52 is configured to thermally manage inverter 26 and to provide heat from the inverter to traction battery 24 by circulating coolant from the inverter to the traction battery. First heating loop 52 includes a main loop 58, a radiator loop 60, and a valve 62 for controlling fluid flow between the main loop and the radiator loop. First heating loop 52 is powered by a pump 64 that circulates coolant through conduits and components of the arrangement. In the illustrated example, coolant flows from pump 64 to inverter 26 via conduit 66. The coolant absorbs heat from inverter 26 as it circulates therethrough. Inverter 26 is connected by a conduit 68 to an (optional) auxiliary heater 70, traction battery 24, and heat exchanger 56. Heat exchanger 56 is connected to an inlet 72 of valve 62 by a conduit. Radiator loop 60 circulates coolant from an outlet 74 of valve 62 to a radiator 76 via a conduit 78.

Second heating loop 54 is configured to thermally manage traction motor 14 and transfer heat to one or more vehicle components either directly via the second heating fluid, or indirectly via one or more heat exchangers, such as heat exchanger 56. Second heating loop 54 also includes transmission 16 and circulates waste heat to first heating loop 52 so that the one or more vehicle components can be heated with heat generated by the transmission in addition to the heat generated by traction motor 14. Transmission 16 includes passageways 80 configured to circulate the second heating fluid through traction motor 14. Passageways 80 are also configured to circulate the second heating fluid through heat exchanger 56. Heat exchanger 56 is designed to transfer heat between first and second coolant loops 52 and 54 without mixing the associated first and second heating fluids. The second heating fluid is circulated by a pump 82 located within transmission 16 and arranged to draw oil from a transmission sump.

Figure 3:
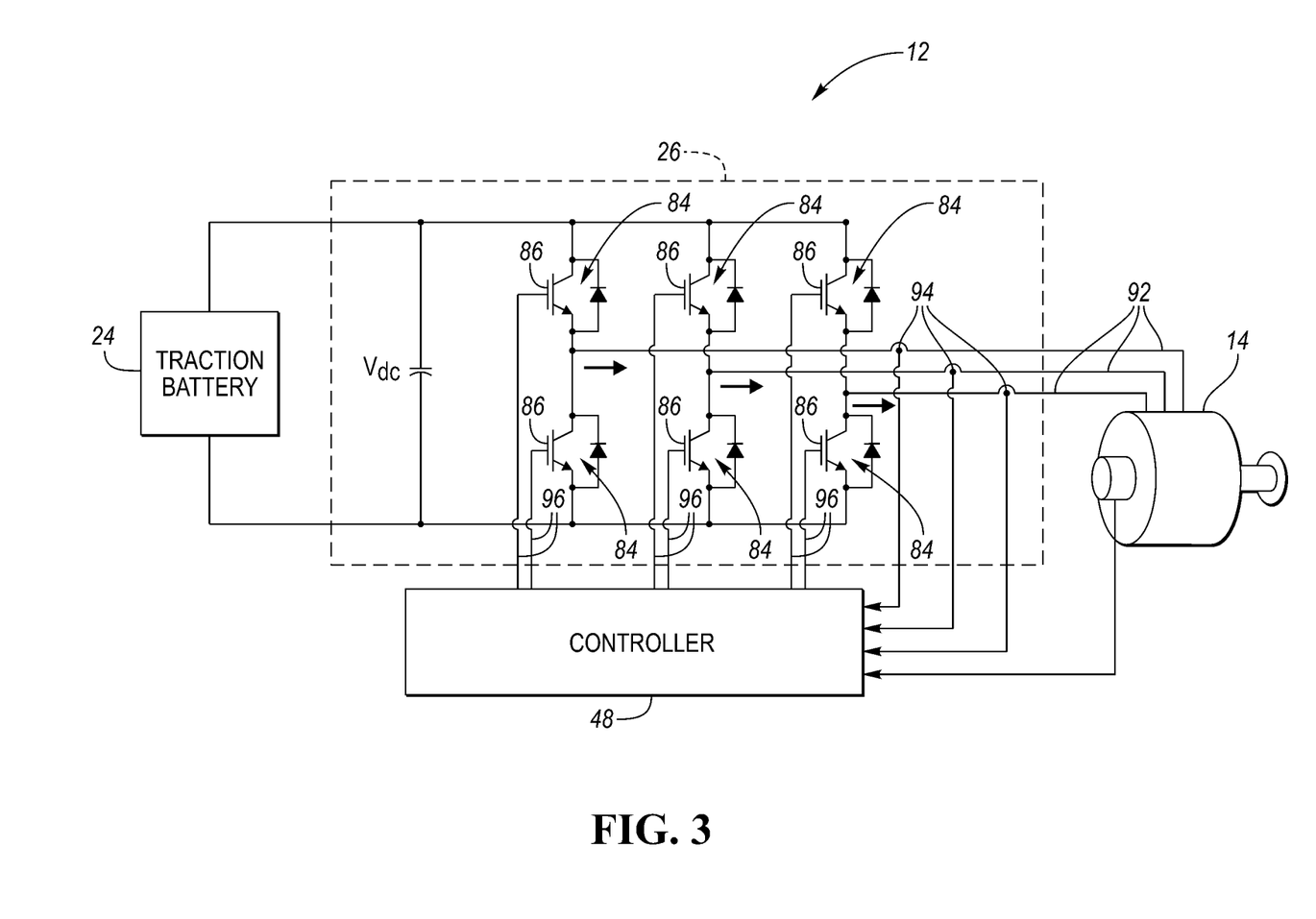
FIG. 3 illustrates a functional diagram of the traction battery, the inverter, and the traction motor of the traction powertrain of the BEV.

Referring now to FIG. 3, with continual reference to FIG. 1, a functional diagram of traction battery 24, inverter 26, and traction motor 14 of the traction powertrain of BEV 12 is shown. As noted above, inverter 26 is coupled between traction battery 24 and traction motor 14. Inverter 26 converts DC electrical power provided from traction battery 24 into AC electrical power for providing to traction motor 14. In this way, inverter 26 drives traction motor 14 with power from traction battery 24 for the traction motor to propel BEV 12. A DC-link capacitor ($V_{dc}$) connected in parallel with traction battery 24 is ordinarily disposed between the traction battery and inverter 26.

Controller 48 is operable to control inverter 26 for the inverter to move electrical power from traction battery 24 for driving (i.e., motoring) traction motor 14. Particularly, controller 48 controls power switches 86 of inverter 26 to open and close (e.g., switch on and off) pursuant to a selected switching frequency and a selected duty cycle for the inverter to move electrical power from traction battery 24 to traction motor 14.

In the exemplary example, inverter 26 includes three sets of pairs of power switching units 84 (i.e., three×two=a total of six power switching units 84 as shown in FIG. 3). Each set of power switching units 84 includes two power switches 86 connected in series. In this example, each power switch 86 is a transistor in the form of an insulated gate bipolar transistor (IGBT).

Each set pair of power switching units 84 is connected in parallel to traction battery 24 and thereby each set pair of power switching units forms a "phase" of inverter 26. Power switches 86 of each of the three phases are electrically connected to traction motor 14 via three power conductors 92, respectively. Current sensors 94 may be disposed to monitor electrical current in power conductors 92. In this way, inverter 26, having three set pairs of power switching units 84, is a three-phase inverter operable for converting DC electrical power from traction battery 24 into three-phase AC electrical power for providing to traction motor 14.

As indicated, controller 48 is operable to control the on-and-off switching operation of power switches 86 to cause inverter 26 to convert a given DC electrical power provided from traction battery 24 into a desired AC electrical power for providing to traction motor 14. In operation, controller 48 receives motor control commands and controls states of inverter 26 to provide motor drive functionalities. Controller 48 monitors signal inputs from position sensors associated with traction motor 14 and from power conductors 82. Controller 48 communicates control signals via control lines 96 to individual ones of power switches 86. Controller 48 includes control circuits, algorithms, and other control elements to generate the control signals. Power switches 86 control the phase currents (i.e., ia, ib and ic), which are transferred via power conductors 92 to traction motor 14 to generate power in the form of torque and/or rotational speed based upon the motor position and/or the motor speed.

In controlling inverter 26 to drive traction motor 14 with the desired AC electrical power, controller 48 controls the operation of power switches 86 according to pulse-width-modulated (PWM) control strategies. In this regard, controller 48 generates a PWM control signal having a selected carrier switching frequency and a selected duty cycle. Power switches 86 in response to PWM control signals switch on and off according to the switching frequency and the duty cycle of the PWM control signals. In this way, power switches 86 are driven at a particular switching frequency and within each cycle of the switching frequency the power switches may be operated at a specified duty cycle. Traction motor 14 is correspondingly driven pursuant to the operation of power switches 86 such as to thereby propel BEV 12.

Referring now back to FIG. 2, as indicated above, thermal management arrangement 50 may include auxiliary heater 70. Auxiliary heater 70 may be provided when it is predetermined that the heat generated by inverter 26, transmission 16, and traction motor 14 may be insufficient to heat one or more components of BEV 12 to a desired temperature. In such situation, auxiliary heater 70 may be included in thermal management arrangement 50 for boosting a temperature of the associated heating fluid. Auxiliary heater 70 may be an electric-resistance heater such as a positive temperature coefficient (PTC) heater. Many electrified vehicles utilize a PTC heater such as auxiliary heater 70 as a heat source for the traction battery. However, the PTC heater typically requires a large amount of electrical power, which may reduce vehicle range.

In accordance with the present disclosure, controller 48 controls inverter 26 to operate in a lossy or inefficient mode for the inverter to generate heat for heating traction battery 24. Controller 48 may control inverter 26 in this lossy or inefficient mode when the controller determines that traction battery 24 requires heating. The heat generated by inverter 26 when operating in the lossy or inefficient mode is transferred via first heating loop 52 to traction battery 24 in order to heat the traction battery. This heat generated by inverter 26 and transferred to traction battery 24 may be sufficient to eliminate, or at least reduce the use of, a PTC heater for heating the traction battery.

Of course, the heat generated by inverter 26 may additionally or alternatively be used to heat other vehicle components or systems such as the passenger cabin of BEV 12. For such situations, first heating loop 52 may be modified accordingly and/or thermal management arrangement 50 may be modified with additional, appropriately configured heating loop(s). Furthermore, the heat generated by inverter 26 can be used for other applications such as for dissipating energy from regenerative braking. In sum, the heat generated by inverter 26 can be used for any heating application or coolant heating application involving BEV 12.

As an overview, the performance of a traction battery depends on the temperature of the traction battery. Cold temperatures may decrease traction battery performance during both charging and discharging operations, particularly for lithium ion phosphate ($LiFePO_4$, lithium ferro phosphate, or LFP) traction batteries. Electrified vehicles may operate to cause the traction motor to generate waste heat under these operating conditions for heating the traction battery. However, the traction motor typically has a relatively poor heat transfer path (e.g., second heating loop 54) to the traction battery. In contrast, the heat transfer path (e.g., first heating loop 52) from the inverter to the traction battery coolant is typically shorter with a relatively better heat transfer path to the traction battery. Thus, the present disclosure provides the lossy or inefficient mode for the inverter. As noted, the heat transfer path from the inverter to the traction battery coolant is shorter and more effective and can act as an additional heating source to thereby supplement or eliminate PTC heater use for this application.

In general, in accordance with the present disclosure, the lossy mode operation of inverter 26 for heating traction battery 24 carried out by controller 48 is a loss mode that produces extra heat in the inverter which is used to help heat the traction battery coolant and thus heat the traction battery. As indicated, inverter 26 has a better heating path to the traction battery coolant than traction motor 14 and therefore has a higher heat transfer efficiency. Controller 48 implements the lossy mode of operation of inverter 26 by controlling a gate driver resistance of power switches 86 of the inverter in a closed loop control to achieve a desired heating effect. The gate driver resistance is variable and controllable and changes the turn-on and turn-off time of power switches 86 of inverter 26. In conjunction with controlling the gate driver resistance of power switches 86, controller 48 may further control the switching frequency of the power switches in the closed loop control to achieve the desired heating effect.

Figure 4A:
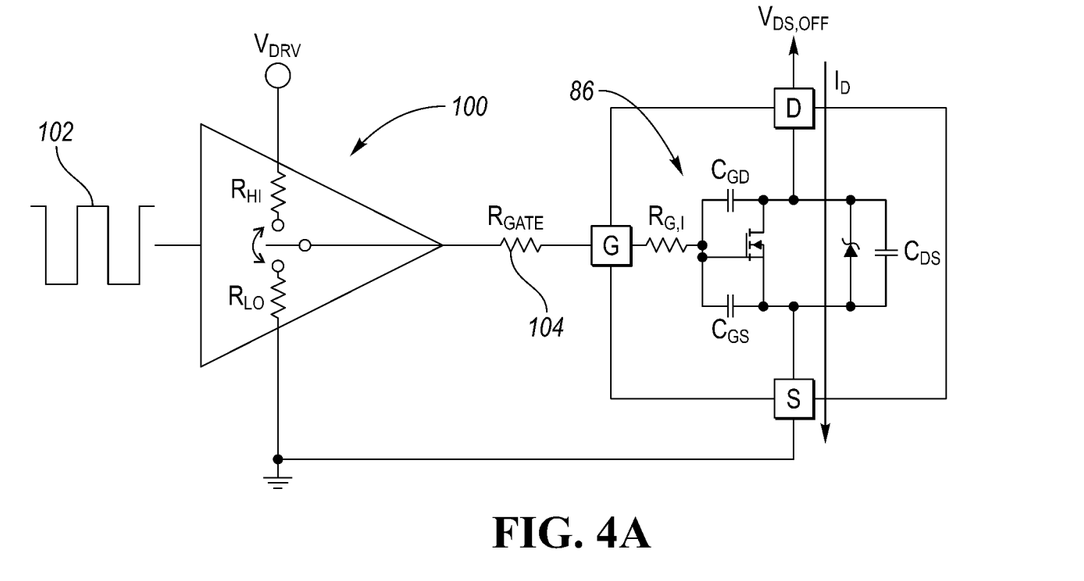
FIG. 4A illustrates a circuit diagram of a gate driver of a controller of the traction powertrain and a power switch of the inverter.
Figure 4B:
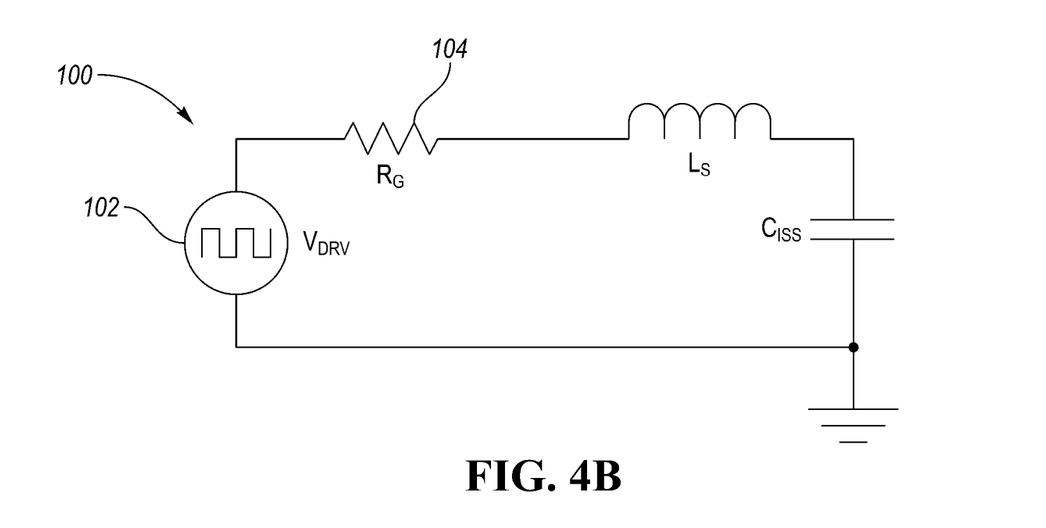
FIG. 4B illustrates a simplified circuit diagram of the gate driver of the controller.

Referring now to FIGS. 4A and 4B, with continual reference to FIG. 3, (i) a circuit diagram of a gate driver circuit 100 of controller 48 and a power switch 86 of inverter 26 and (ii) a simplified circuit diagram of the gate driver of the controller are shown, respectively. In FIG. 4A, power switch 86 is depicted as a MOSFET power switch.

As noted, to control the switching configuration of inverter 26, controller 48 changes the switching state of power switches 86 of the inverter to either an on state or an off state. To switch a power switch 86 to either the on state or the off state, gate driver circuit 100 of controller 48 applies a gate voltage to the power switch. In this regard, controller 48 produces a modulation signal, of a form such as a pulse train, pulse width modulated (PWM) signal, to control the gate modulation.

Gate driver circuit 100 includes a gate driver resistor ($R_{Gate}$ or $R_G$) 104. Gate driver resistor 104 is a variable resistor having a gate driver resistance that is variable and controllable. Controller 48 is configured to control gate driver resistor 104 to change the value of the gate driver resistance.

As noted, the turn-on time and turn-off time of a power switch 86 depend on the gate driver resistance. Thus, changing the gate driver resistance causes the turn-on and turn-off times to correspondingly change. Particularly, increasing the gate driver resistance causes the turn-on and turn-off times to increase. Larger turn-on and turn-off times of a power switch means that the on and off state transitions of the power switch are slower. Slower transitioning of the power switch results in larger power losses of inverter 26. These larger power losses result in larger heat output of inverter 26. Such larger heat output of inverter 26 can be used for heating traction battery 24 as described above.

Figure 5:
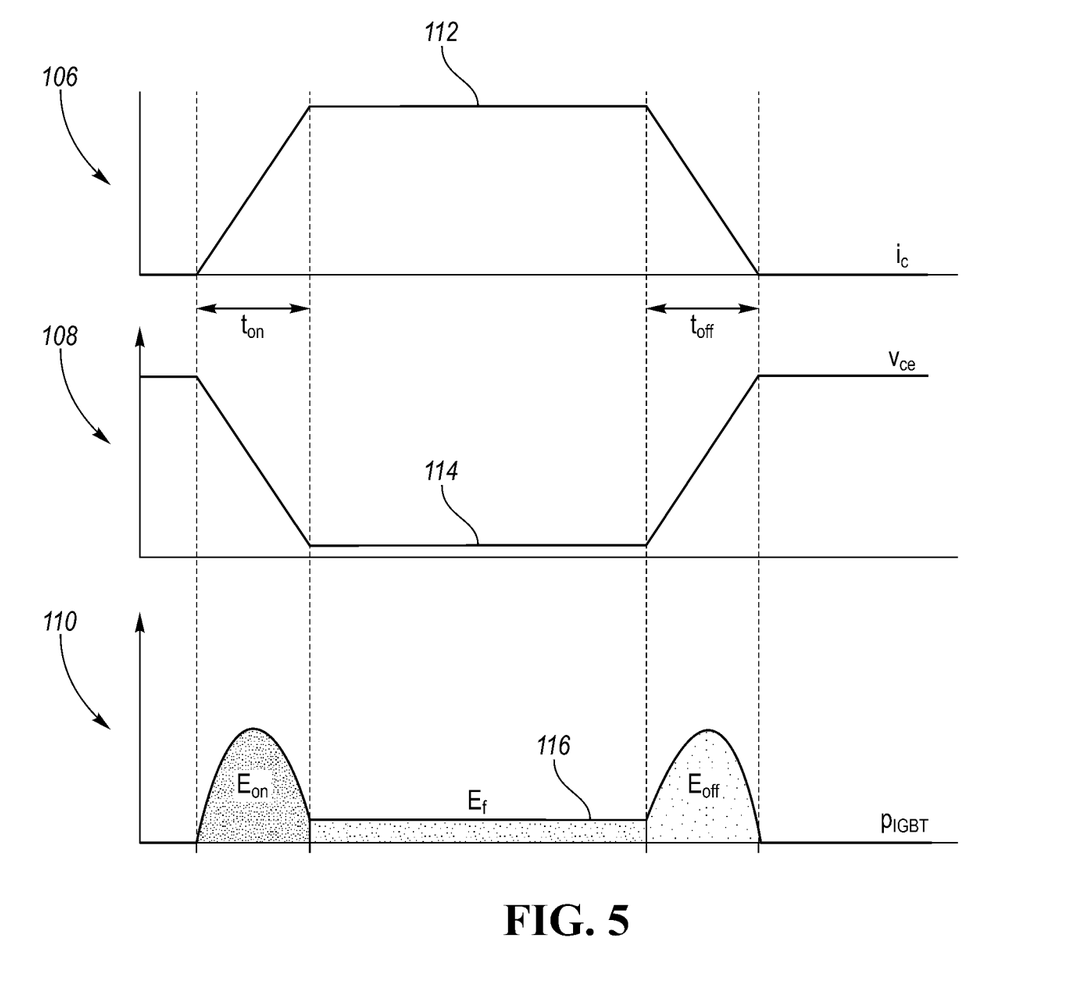
FIG. 5 illustrates a set of graphs including respective plots of current, voltage, and power loss of a power switch of the inverter during a turn-on state transition, an on state operation, and a turn-off state transition.

Referring now to FIG. 5, a set of graphs 106, 108, and 110 including respective plots of current (plot 112), voltage (plot 114), and power loss (plot 116) of a power switch 86 (in the form of an IGBT) of inverter 26 over time during a turn-on state transition, an on state operation, and a turn-off state transition is shown. As can be seen in power loss plot 116, a relatively dense power loss ($E_{on}$) of power switch 86 is associated with the turn-on state transition and a relatively dense power loss ($E_{off}$) of power switch 86 is associated with the turn-off state transition. A relatively less dense power loss ($E_f$) is associated with the on state operation.

In summary, higher gate driver resistance leads to slower transition for IGBT and MOSFET power switches 86 of inverter 26. Slower switching results in higher switching losses of inverter 26. Most of the loss in inverter 26 is during the transition time of power switches 86. Consequently, increasing the transition time increases the losses. In addition, longer switching time will increase deadtime and increase concordant losses in traction motor 14—all adding to lossy mode heating.

In further detail for loss energy estimation of a power switch, there are three components of loss in the power switch. These three components are (1) turn-on loss, (2) turn-off loss, and (3) conduction loss.

The turn-on loss of a power switch may be represented by the following equation:

$$P_{on} = 1/2 * V_t * (I_p + I_{rrm}) * (t_{ri} + t_{rr}) * F_s$$

$P_{on}$ is the turn-on loss of the power switch; $I_{rrm}$ is the reverse recovery current; $t_{ri}$ is the rise time; $t_{rr}$ is the reverse recovery interval; and $F_s$ is the switching frequency of the power switch. As set forth, the turn-on loss of the power switch is a function of the rise time and the switching frequency, which can be controlled by controller 48.

The turn-off loss of a power switch may be represented by the following equation:

$$P_{off} = 1/2 * V_{off} * I_{on} * t_{fi} * F_s$$

$P_{off}$ is the turn-off loss of the power switch; $t_{fi}$ is the fall time; and $F_s$ is the switching frequency of the power switch. As set forth, the turn-off loss is a function of the fall time and the switching frequency, which can be controlled by controller 48.

The conduction loss of a power switch may be represented by the following equation:

$$P_{cn} = I_{on(avg)} * V_{on} + I_{on(rms)}^2 * R_{on}$$

As set forth, the conduction loss of the power switch occurs while the power switch is turned on.

Figure 6A:
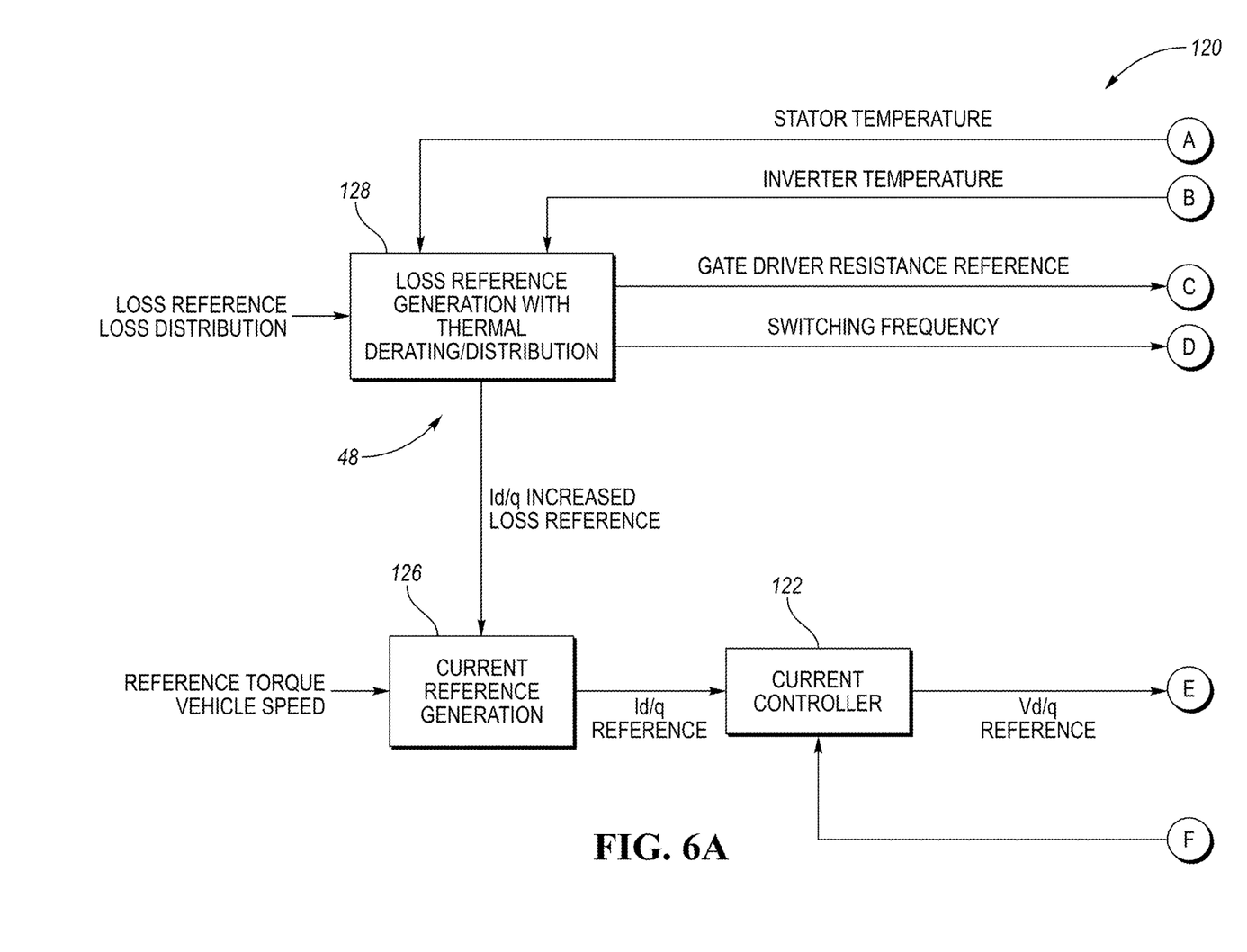
FIGS. 6A and 6B illustrate a block diagram of a feedback control algorithm implemented by the controller for controlling a gate driver resistance and a switching frequency of the power switches of the inverter to intentionally increase the heat generated by the inverter for use in heating the traction battery.
Figure 6B:
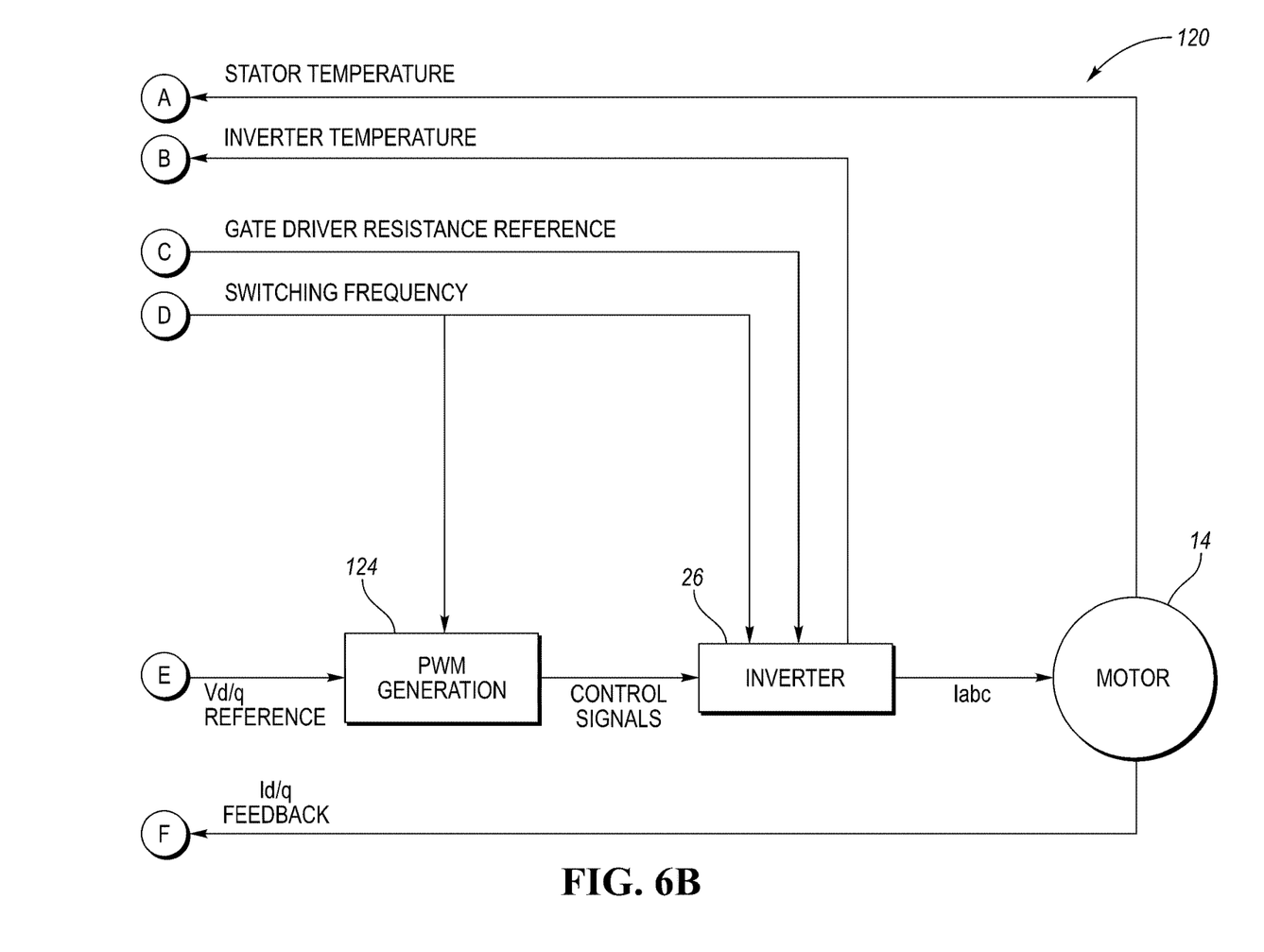

Referring now to FIGS. 6A and 6B, a block diagram 120 of a feedback control algorithm implemented by controller 48 for controlling the gate driver resistance and the switching frequency of power switches 86 of inverter 26 to intentionally increase the heat generated by the inverter for use in heating traction battery 24 is shown. In block diagram 120, certain components of controller 48 are individually shown. These individually shown components of controller 48 are a current controller 122, a PWM generator 124, a current reference generator 126, and a loss reference generator (with thermal derating/distribution) 128.

In operation, current reference generator 126 generates an Id/q reference signal based on a reference torque and vehicle speed. Current controller 124 converts the Id/q reference signal into a corresponding Vd/q reference signal which is used by PWM generator 124 to control inverter 26 for traction motor 14 to be controlled to provide the reference torque and vehicle speed.

In further operation, according to the inverter lossy mode control pursuant to the present disclosure, loss reference generator 128 receives a loss reference and loss distribution signal based on a difference between the temperature of traction battery 24 (i.e., the actual temperature of the traction battery) and a desired temperature of the traction battery. In turn, loss reference generator 128 may pass a corresponding Id/q increased loss reference signal to current reference generator 126. When receiving the Id/q increased loss reference signal from loss reference generator 128, current reference generator 126 modifies the Id/q reference signal according to the Id/q increased loss reference signal.

Further in response to receiving the loss reference and loss distribution signal based on the difference between the actual and desired temperatures of traction battery 24, loss reference generator 128 selects a gate driver resistance and a switching frequency. As indicated, the selected gate driver resistance is the value of the gate driver resistance for power switches 86 of inverter 26 to be used while the power switches turn-on and/or turn-off and the selected switching frequency is the number of cycles per given time at which the power switches are driven.

Loss reference generator 128 provides a gate driver resistance signal indicative of the selected gate driver resistance to inverter 26. In turn, the selected gate driver resistance is implemented by gate driver circuit 100 for each of power switches 86. As noted, the turn-on loss and turn-off loss of power switches 86 depend on the gate driver resistance.

Loss reference generator 128 provides a switching frequency signal indicative of the selected switching frequency to PWM generator 124 and to inverter 26. In turn, inverter 26 is driven at the selected switching frequency. As noted, the turn-on loss and turn-off loss of power switches 86 depend on the switching frequency.

The values of the gate driver resistance and the switching frequency are selected by loss reference generator 128 so that inverter 26 is controlled to generate an appropriate amount of heat for heating traction battery 24 to cause the actual temperature of the traction battery to reach the desired temperature of the traction battery. In this way, the gate driver resistance and the switching frequency are controlled in a closed loop fashion to achieve a target inverter temperature.

In further operation, loss reference generator 128 receives an inverter temperature signal indicative the temperature of inverter 26 and a stator temperature signal indicative of the temperature of traction motor 14. Loss reference generator 128 uses the inverter temperature feedback to derate losses in inverter 26 (shifts losses to traction motor 14 is possible) and uses the stator temperature feedback to derate traction motor losses (shifts losses to the inverter if possible).

As described, the present disclosure provides an inverter "lossy" mode of operation that controls the gate driver resistance, and perhaps also the switching frequency, in a closed loop to intentionally generate extra losses in inverter 26 and thereby increase the heat generated by the inverter. This heat can be captured and used to warm traction battery 24.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A system comprising:
an inverter configured to drive a traction motor with electrical power from a traction battery according to a configuration of a power switch of the inverter; and
a controller configured to control a variable gate driver resistance for the power switch in a closed loop fashion to achieve a target temperature of the inverter.

2. The system of claim 1 wherein:
the controller increases the gate driver resistance to increase an actual temperature of the inverter.

3. The system of claim 2 wherein:
the controller decreases the gate driver resistance to decrease the actual temperature of the inverter.

4. The system of claim 1 further comprising:
a heating coolant loop for transferring heat generated by the inverter to the traction battery to warm the traction battery.

5. The system of claim 1 wherein:
the target temperature of the inverter depends on a target temperature of the traction battery.

6. The system of claim 1 wherein:
the controller is further configured to further control a switching frequency of the power switch in the closed loop fashion to achieve the target temperature of the inverter.

7. The system of claim 6 wherein:
the controller increases the switching frequency to increase an actual temperature of the inverter.

8. The system of claim 7 wherein:
the controller decreases the switching frequency to decrease the actual temperature of the inverter.

9. The system of claim 1 wherein:
the power switch is either an insulated-gate bipolar transistor (IGBT) power switch or a metal-oxide-semiconductor field-effect transistor (MOSFET) transistor.

10. The system of claim 1 wherein:
the inverter includes a plurality of power switches and is configured to drive the traction motor with electrical power from the traction battery according to a configuration of the power switches; and
the controller is further configured to control a variable gate driver resistance for each of the power switches in the closed loop fashion to achieve the target temperature of the inverter.

11. The system of claim 1 wherein:
a turn-on time and a turn-off time of the power switch depend on the gate driver resistance.

12. A method for use with a power electronics module configured to drive a traction motor with electrical power from a traction battery according to a configuration of a power switch of the power electronics module, the method comprising:
setting a gate driver resistance for the power switch according to a difference between an actual temperature of the traction battery and a desired temperature of the traction battery;
controlling the power switch with the gate driver resistance to thereby cause the power electronics module to generate an amount of heat dependent on the gate driver resistance; and
transferring at least some of the heat generated by the power electronics module to the traction battery to warm the traction battery.

13. The method of claim 12 further comprising:
setting a switching frequency for the power switch according to the difference between the actual temperature of the traction battery and the desired temperature of the traction battery;
controlling the power switch further with the switching frequency to thereby cause the power electronics module to generate an additional amount of heat dependent on the switching frequency; and
transferring at least some of the additional heat generated by the power electronics module to the traction battery to warm the traction battery.

14. The method of claim 12 wherein:
the power electronics module is an inverter.

15. The method of claim 14 wherein:
the traction battery is a lithium ion phosphate (LFP) traction battery.

16. An electrified vehicle comprising:
a traction battery;
a traction motor;
a power electronics module configured to drive the traction motor with electrical power from the traction battery according to a configuration of a power switch of the power electronics module;
a controller configured to set a gate driver resistance for the power switch according to a difference between an actual temperature of the traction battery and a desired temperature of the traction battery and to control the power switch with the gate driver resistance to thereby cause the power electronics module to generate an amount of heat dependent on the gate driver resistance; and
a heating coolant loop configured to transfer at least some of the heat generated by the power electronics module to the traction battery to warm the traction battery.

17. The electrified vehicle of claim 16 wherein:
the controller is further configured to set a switching frequency for the power switch according to the difference between the actual temperature of the traction battery and the desired temperature of the traction battery and to control the power switch further with the switching frequency to thereby cause the power electronics module to generate an additional amount of heat dependent on the switching frequency; and
the heating coolant loop is further configured to transfer at least some of the additional heat generated by the power electronics module to the traction battery to warm the traction battery.

18. The electrified vehicle of claim 16 wherein:
the power electronics module is an inverter.

19. The electrified vehicle of claim 16 wherein:
the traction battery is a lithium ion phosphate (LFP) traction battery.

20. The electrified vehicle of claim 16 further comprising:
a passenger cabin; and
wherein at least some of the heat generated by the power electronics module is used to warm the passenger cabin.

* * * * *